F. H. FOLDEN.
MULTIMOLDING CONCRETE BLOCK MACHINE.
APPLICATION FILED FEB. 27, 1911.
1,058,170.
Patented Apr. 8, 1913.
6 SHEETS—SHEET 1.
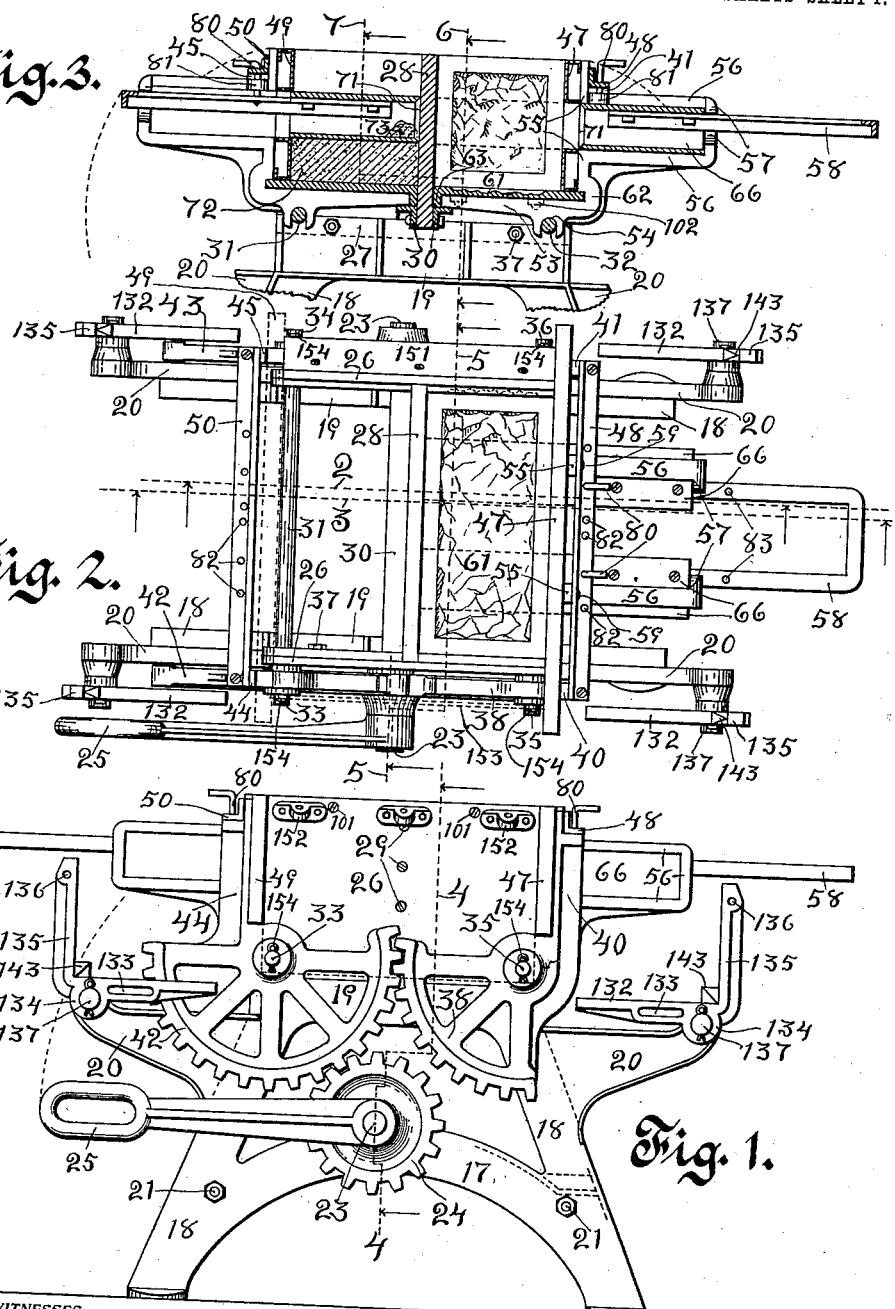

F. H. FOLDEN.
MULTIMOLDING CONCRETE BLOCK MACHINE.
APPLICATION FILED FEB. 27, 1911.

1,058,170.

Patented Apr. 8, 1913.

6 SHEETS—SHEET 2.

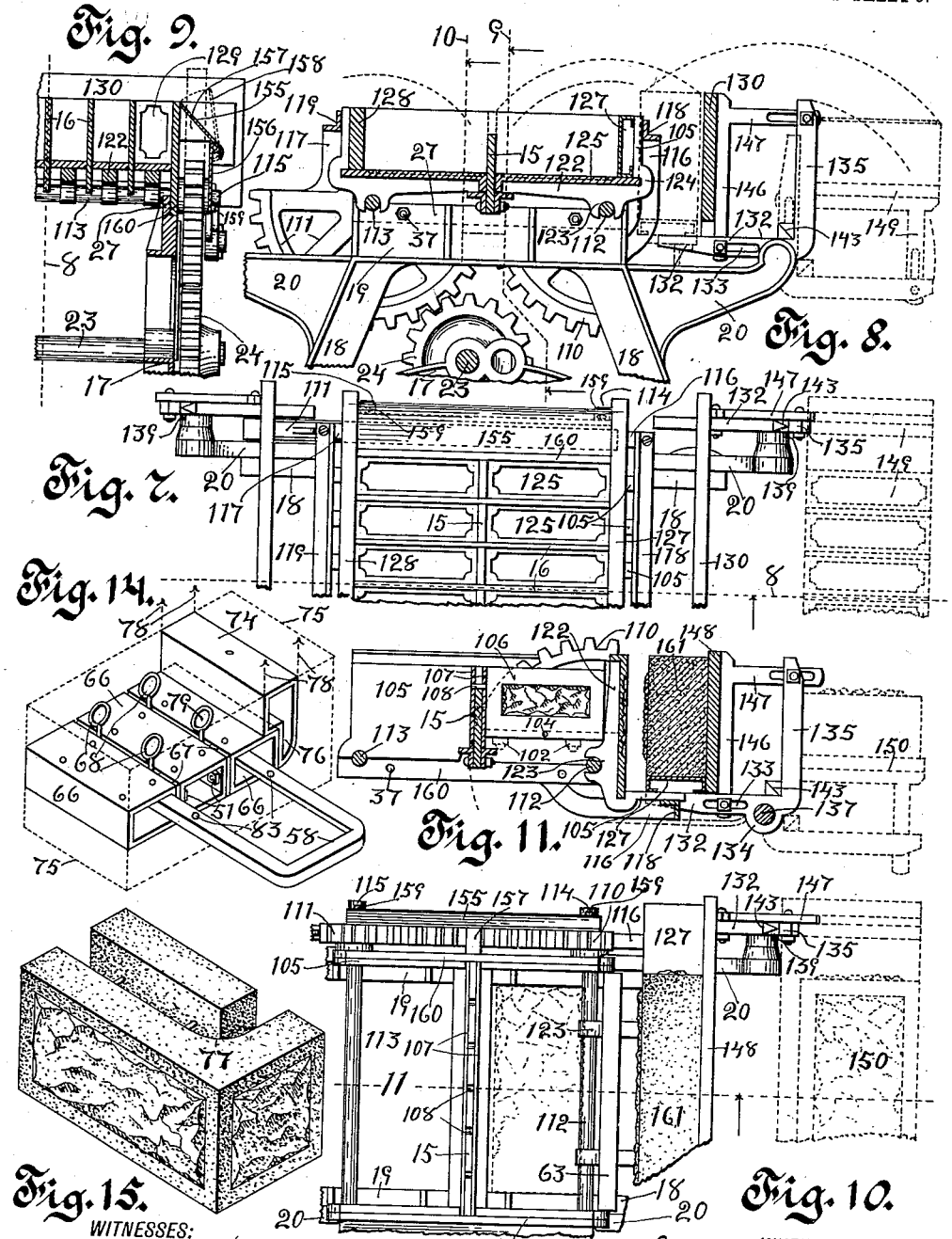

F. H. FOLDEN.
MULTIMOLDING CONCRETE BLOCK MACHINE.
APPLICATION FILED FEB. 27, 1911.
1,058,170.
Patented Apr. 8, 1913.
6 SHEETS—SHEET 4.
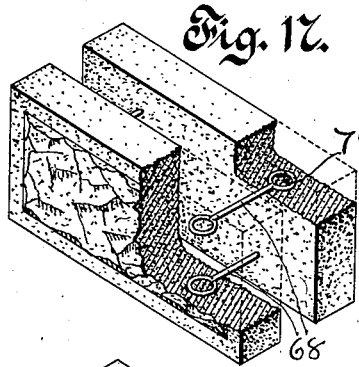
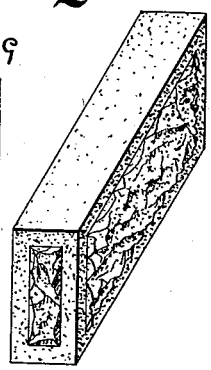
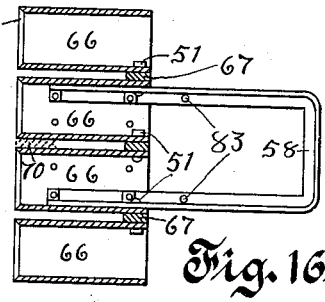
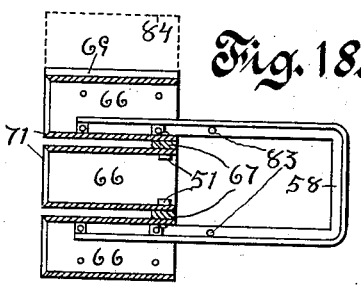
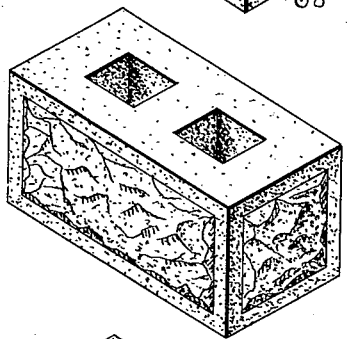
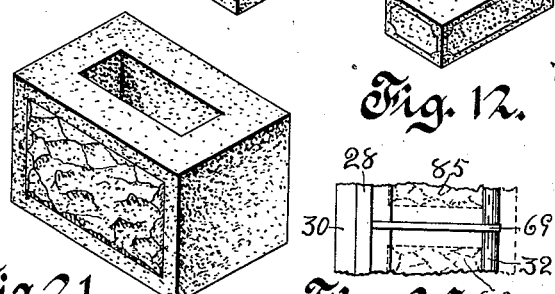
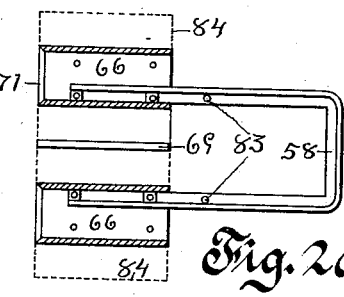
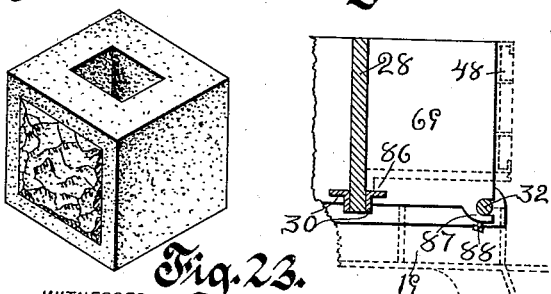
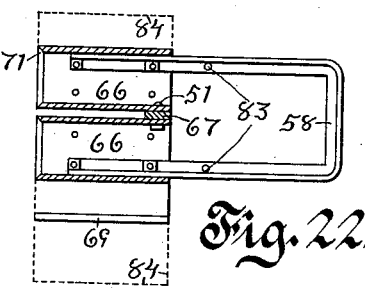
WITNESSES:
Burl Vaughan
H. O. L. Ollermann
INVENTOR
Frank H. Folden,
BY Lou. Vaughan,
his ATTORNEY
COLUMBIA PLANOGRAPH CO., WASHINGTON, D. C.

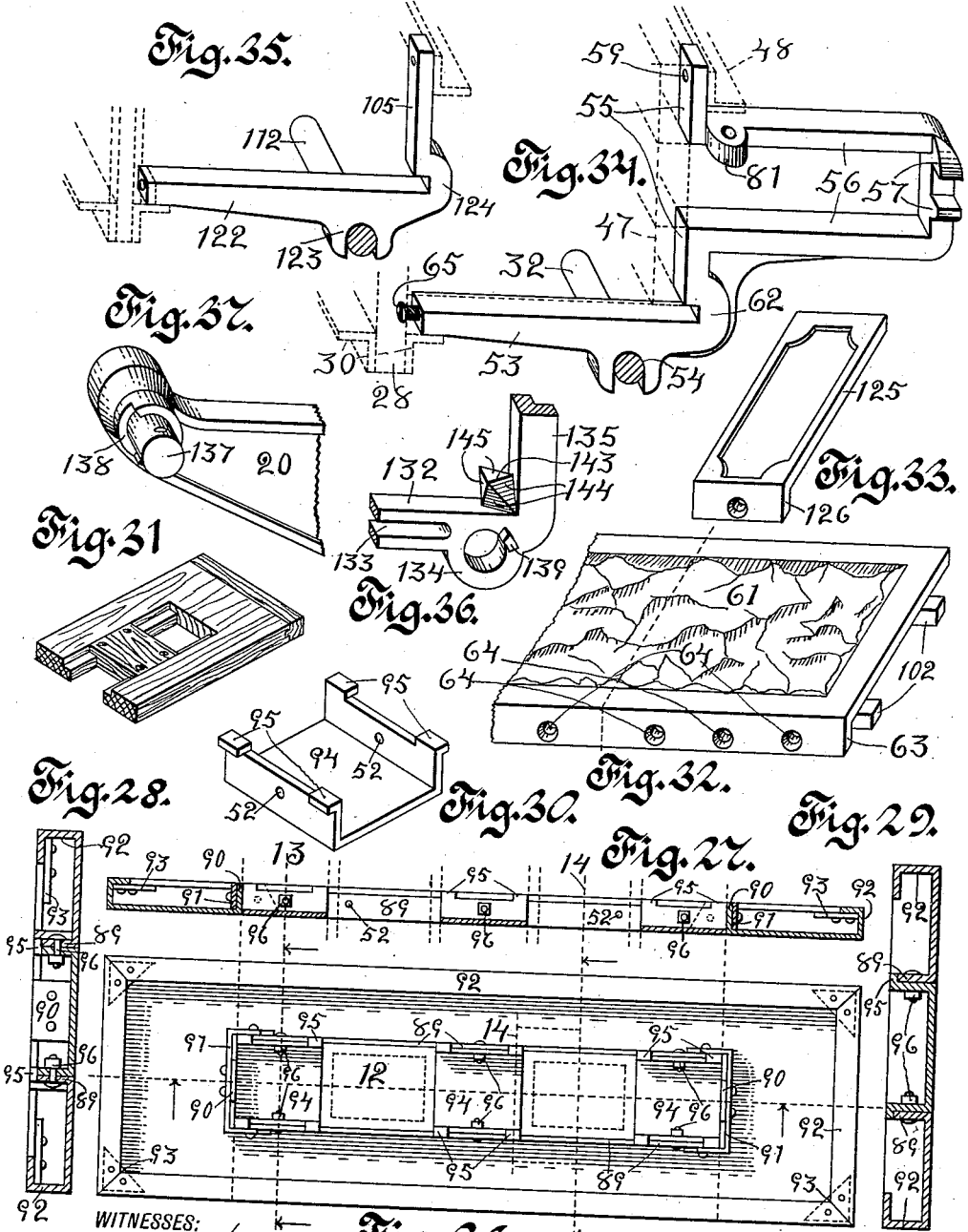

F. H. FOLDEN.
MULTIMOLDING CONCRETE BLOCK MACHINE.
APPLICATION FILED FEB. 27, 1911.

1,058,170.

Patented Apr. 8, 1913.
6 SHEETS—SHEET 6.

WITNESSES:
Burl Vaughan
H. O. L. Ollermann

INVENTOR
Frank H. Folden,
BY Jon Vaughan,
his ATTORNEY.

UNITED STATES PATENT OFFICE.

FRANK H. FOLDEN, OF BLAIR, NEBRASKA.

MULTIMOLDING CONCRETE-BLOCK MACHINE.

1,058,170.    Specification of Letters Patent.    Patented Apr. 8, 1913.

Application filed February 27, 1911. Serial No. 611,155.

*To all whom it may concern:*

Be it known that I, FRANK H. FOLDEN, a citizen of the United States of America, residing at Blair, in the county of Washington and State of Nebraska, have invented certain new and useful Improvements in Multimolding Concrete-Block Machines, of which the following is a specification.

My invention relates to improvements in the "multi-molding two-side-delivery hand brick-machines" as disclosed and claimed in Letters Patent of the United States, No. 917,036, issued to Frank H. Folden, and of date April 6, 1909; and the objects of my improvement are, primarily, to apply the principle of multi-molding double-delivery in one machine capable of molding all sizes and forms of concrete blocks from the smallest, termed bricks, to the largest usually employed in erecting ordinary concrete-block structures; second, to provide adjustable sectional cores, and mold walls or pallet boards having adjustable openings through which to work said cores and otherwise operate conjointly with the whole machine in molding the variously cored hollow blocks, and blocks consisting of outer or face slabs and inner slabs secured together by metal anchors for wall construction having a continuous hollow space; third, to facilitate the application of special face finishings, such as different colored dusts, sands, pebbles or broken marble or granite, to any of the molded blocks; fourth, to provide automatically opening and closing housings to protect the operating gearing from the scattered grit while filling the molds. These and numerous other minor objects hereinafter more particularly disclosed I attain by the mechanism illustrated in the accompanying drawings, in which—

Figure 4:
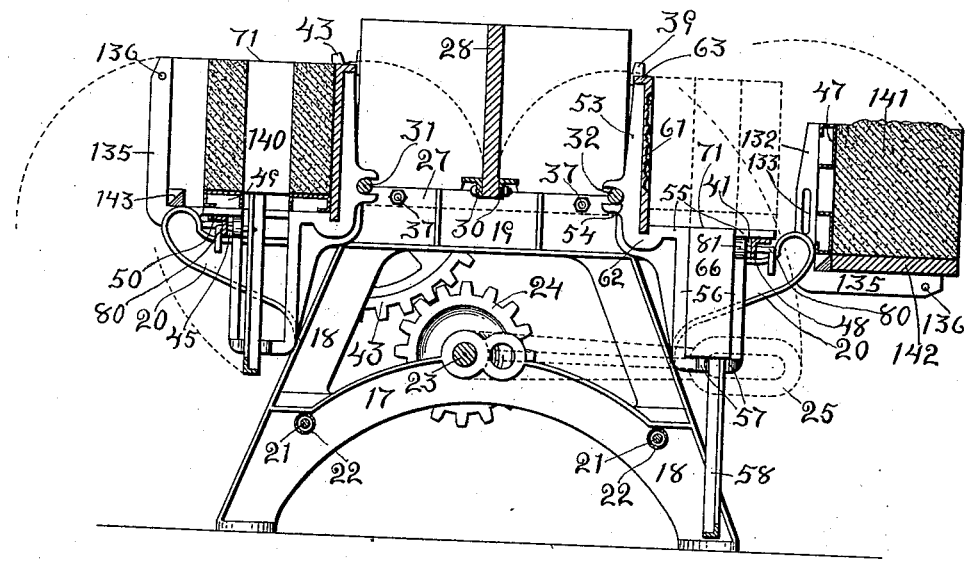
Figures 5, 6:
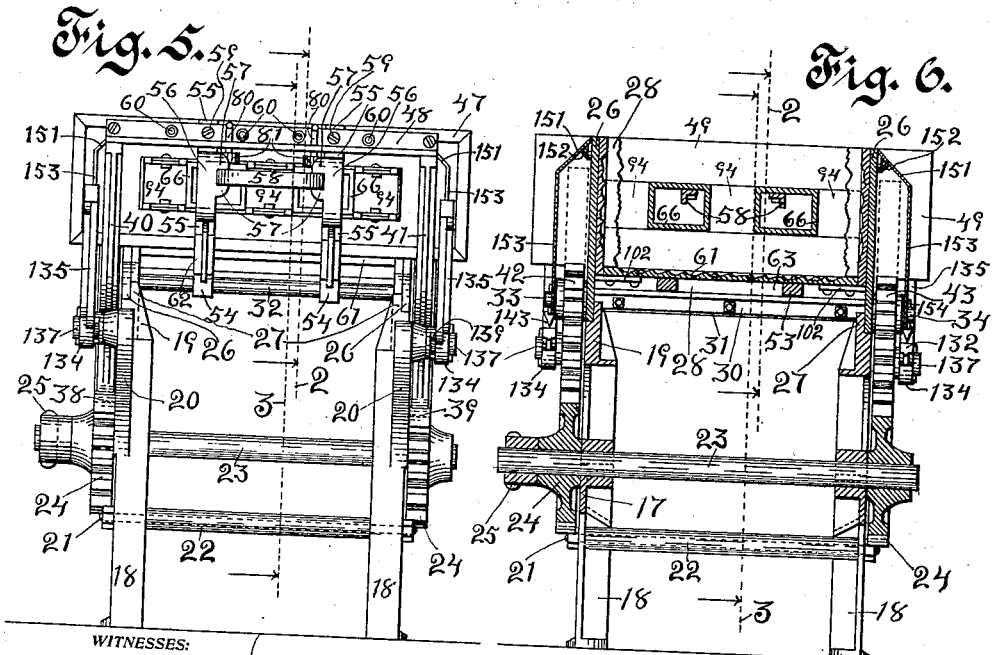
Figure 39:
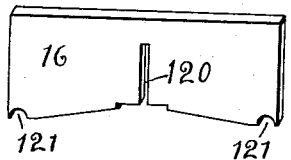
Figure 38:
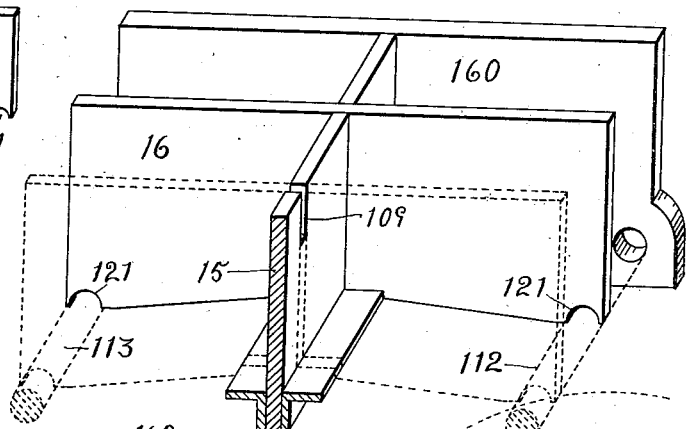
Figure 41:
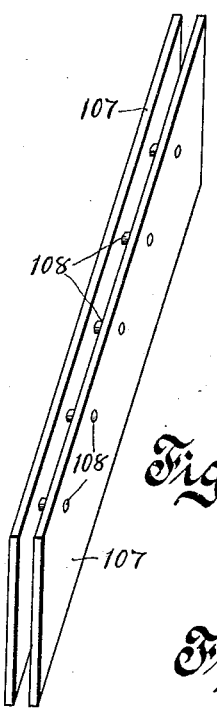
Figure 40:
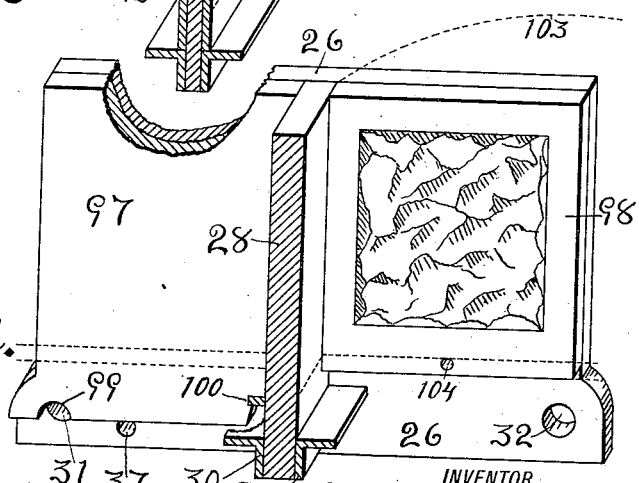

Figure 1 is a side elevation of the machine arranged and closed ready to mold two large blocks, the housing being removed to disclose the operating gear which is identical with that of the original machine; Fig. 2, a top view of the same arrangement after the removal from one end of the core, face-plate or mold-bottom and pallet board or front-plate, all of which are detachable; Fig. 3, a vertical longitudinal section of the removable top or mold-head of the same arrangement, taken on the broken line 2 of Figs. 2, 5 and 6, the positions of the parts being modified as hereinafter more particularly explained; Fig. 4, a vertical longitudinal section of the whole, arranged for the same kind of work as in Fig. 1, taken at the plane indicated by the broken line 3 in Figs. 2, 5 and 6, and showing the parts at opposite ends in different operating positions; Fig. 5, an end elevation of Figs. 1 and 2; Fig. 6, a vertical cross-section on the irregular broken lines 4, 5, 6 and 7 of Figs. 1, 2 and 3; Fig. 7, a half top view of a shallower top or mold-head substitutory for the deep large block mold-head and arranged for molding small blocks or brick like that shown in Fig. 12; Fig. 8, a vertical longitudinal section on the broken central line 8 of Figs. 7 and 9; Fig. 9, a vertical cross section on the irregular broken lines 9 and 10 of Fig. 8; Fig. 10, a top view of part of the same shallow mold fitted and adjusted to mold the thin facing slab shown in Fig. 13; Fig. 11, a vertical longitudinal section on the broken central line 11 of Fig. 10; Figs. 12 and 13 are perspective views respectively of a small block or brick and a large thin facing slab, both molded in the shallow mold-head and each molded with a return end; Fig. 14, is a perspective view illustrating the management and arrangement of a sectional core for molding large return angle or corner blocks of inner and outer slabs united by metal anchors to form a wall with a continuous hollow; Fig. 15, a perspective view of such a corner-block molded around the core arranged as shown in Fig. 14; Fig. 16, an underside sectional view of the core and connected U-shaped core-frame as arranged for molding full-length straight wall blocks of this kind; Fig. 17, a perspective view of the last mentioned block with parts cut away to disclose the anchors; Fig. 18, illustrates the arrangement of core and frame for a three-fourths-length block of the same character; Fig. 19, a perspective view of a full-length double cored block molded with the core arranged as shown and applied in Figs. 2, 5 and 6; Fig. 20, shows an arrangement of core for half-length hollow blocks; Fig. 21, is a perspective view of a three-fourths length block with a single hollow; Fig. 22, illustrates the arrangement of core and core-frame to mold the block shown in Fig. 21; Fig. 23, a perspective view of a half-length hollow block; Figs. 24 and 25, are side elevation and top view respectively of the applied removable and laterally adjustable vertical partition to divide the deep molds as required for making shorter blocks with the different arrangements of core; Fig. 26, is an outside elevation of a sheet-metal pallet board or swinging outer wall of the mold having a central opening made divisible and adjustable to fit the adjustable core operated therethrough; Fig. 27, a longitudinal sectional view on the central broken line 12 of Fig. 26; Figs. 28 and 29 are cross-sections respectively on the broken line 13 and irregular broken line 14 in Figs. 26 and 27; Fig. 30, a perspective view of one of the detachable filler-plates for filling a portion of or dividing the opening through the pallet board; Fig. 31, a perspective view illustrating a modified construction and an arrangement of the grain in a wooden pallet board; Figs. 32 and 33, are perspective views of upwardly and outwardly-swinging face-forming mold-bottom plates for ornamental rock-faced blocks or slabs and panel-faced bricks respectively; Fig. 34, a perspective view in detail of one of the removable positionally adjustable right angled rocking-arms that carry the block-mold face-plates and cores; Fig. 35, a like perspective detail view of one of the similar removable right angled rocking-arms to carry the bottom face-plates of the facing-slab and brick molds; Figs. 36 and 37, are perspective views of the angle and joint connection of the rocking transfer angle-arms to the rigid arm of the machine-frame; Fig. 38, is a perspective detail of a side portion of the shallow mold-head, as arranged for molding bricks; Fig. 39, a reduced scale perspective of one of the detached removable partitions to divide the full slab molds into smaller slab or into brick molds on both sides of the central cross-bar support and partition; Fig. 40, a detail perspective illustrating the arrangement and management of the shallow top or head for molding facing slabs with or without return ends; Fig. 41, a perspective view of the deatched reducing saddle, substituted in Fig. 40 for the brick partition shown in Figs. 38 and 39; and Fig. 42, a perspective detail of a side portion of the large block mold-head. Throughout all of these views curved broken lines indicate the sweep of rocking parts to which they are connected and similar reference numerals refer to similar parts.

By arranging the two opposite nests of brick molds with the inner ends of individual molds abutting the central cross-bar partition or back-plate 15,—as shown in Fig. 7,—the machine is reduced in size in the direction of the length of said partition and made end-delivering instead of side-delivering, as in the originally arranged patented machine. The thickness of six brick-molds in each nest including the intervening longitudinal partitions 16, gives a machine width to accommodate a desired length of large block and slab molds. This arrangement gives two large molds one on each side of said central cross-bar partition, as shown in Figs. 2, 3, 10 and 11 and allows the finished blocks to be delivered oppositely therefrom at opposite ends of the machine.

The supporting frame consists of opposite sides each having an integral arched tie 17 between footed legs 18 and 18, an integral connecting head 19 and longitudinal end arms 20 and 20. These opposite sides are connected toward the feet by the rods 21 disposed through the sides and through the interposed pipe struts 22. Across the arches the driving rock-shaft 23 is journaled and has mounted at each end to rock therewith the driving pinions 24 and 24 and at one or both ends an operating hand-lever 25. And the two substitute or interchangeable tops or mold-heads are each provided with gearing to engage the driving pinions when the head is in position on the frame.

The mold-head for large and cored blocks comprises the side-plates 26 and 26 having bases fitted to the flanges 27 along the heads of the frame sides. These opposite side-plates are connected by the central cross-bar partition or mold back-plate 28 fastened therebetween by the machine screws 29. The central cross partition serves as a back-plate to both opposite end molds in any arrangement of the mold-head. Along the lower edge on opposite sides of said cross-partition the angle-bars 30 are bolted to stop and support the flanged swinging edge of the mold bottom or face-plate and to reinforce its lower edge as a cross-bar connection and support. The two journal-bars 31 and 32, are disposed across through the lower outer corners of the side-plates, rigidly fastened therein and their ends projected beyond the outer faces of the side-plates to form the stud-journals 33 and 34 for the large gears and 35 and 36 for the quadrant gears. These journal-bars are disposed so that they fit into semicircular notches in the top edges of the flanges on the frame head—see Figs. 4 and 5—and the lower edge of the central cross-partition engages a rectangular notch at the centers of said flanges. For further security the bolts 37 are disposed through the flanges and lower edges of the side-plates, but ordinarily the mold-head is sufficiently heavy to retain its position without the bolts.

The two quadrant gears 38 and 39 having arms 40 and 41, are mounted to revolve on the stud-journals 35 and 36. Gears 42 and 43 of the same diameter as the quadrant gears and having the arms 44 and 45 are mounted to revolve on the stud-journals 33 and 34; these gears engage and drive the quadrant gears and are of longer arc to be engaged by the driving pinions on the driving-shaft below. The diameters of the driving pinions are one-half that of the larger gears; so that a one-half revolution of the hand-lever, from the position shown in Fig. 1 to that indicated by the broken lines 25 in Fig. 4, gives the driven gears a one-fourth revolution; the limit of their movement to open the molds and deliver the molded blocks or to close the molds for refilling. The arms on the quadrant gears are tangentially disposed from the hubs of the gears to carry and support the ends of the pallet board or front plate 47 closed against the ends of the side-plates of the mold head. The ends of the arms are shaped to form right angled seats into which the angle-bar 48, disposed parallel with and spaced away from the pallet-board, has its ends fastened. At the opposite end of the mold-head the arms 44 and 45 on the larger gears are reversely disposed to oppositely carry and support the pallet board 49; and the ends of these arms are connected by and carry in a like manner the similarly but oppositely disposed angle-bar 50. The outer edges of the outwardly disposed flanges of these angle bars strike down onto the arms 20 of the machine frame, as shown in Fig. 4, to limit the opening movement of the molds to a one-fourth revolution.

A pair of right and left right-angled rocking-arms,—see Figs. 3, 4, 5 and 34,—are each composed of a bottom arm 53 having a forked box 54 by which the rocking arm is removably mounted to shift laterally and to rock inwardly and outwardly on the journal bar 32; and a pallet-arm 55 having an intermediate outwardly disposed core-loop 56 to guide and support the mold cores. The opposed faces of the core-loops have the guide lugs 57 to carry the U-shaped core-frame 58. The pallet arms carry and support the center of the pallet board and have at their ends threaded perforations to receive the screws 59 by which the rocking arms are rigidly attached to the angle-bar 48 carried by the quadrant gears. A series of pairs of perforations 60 in the radial flange of said angle-bar—see Fig. 5—permit the pair of angle-arms to be shifted laterally to agree with the different core arrangements, as hereinafter described. The bottom arms carry the face-molding plate or mold-bottom 61. Outward bends 62 at the bases of the pallet arms form notches to engage the outer edge of the bottom-plate. The inner edge of the bottom-plate has the flange 63,—see Fig. 32,—with a series of pairs of perforations 64, agreeing laterally with the pairs of perforations in the angle-bar, to receive the fastening screws 65 threaded in the ends of the bottom arms to fasten the arms to the plates at the lateral position required by the core adjustment being used.

The core-sections 66 are short tubes of rectangular cross section, see Figs. 5 and 6,—four laterally disposed sections being required for a full-length block core, as shown in Fig. 16. The sections are fastened together by the bolts 51 but are spaced apart by the spreaders 67 to leave room for the insertion of the metal anchors 68 and for the partition 69; also for the slip partition 70, as indicated by the broken cross section in Fig. 16, when molding half-length full-hollow plain-faced blocks. In any of the different arrangements of core sections the legs of the U-shaped core-frame are inserted in some two of the sections and bolted to the tops thereof as shown. The rocking-arms are laterally adjusted to bring the guide-lugs on the core-loops into engagement with the outer edges of the core-frame to support and keep in alinement the outer ends of the core sections; the core being further supported and guided by the opening or openings in the pallet board through which the core slides into or out of the mold. The core sections have their inner ends beveled from the inside to an outer edge 71, to cut off the excess of fill when the core is inserted; the lower part of the mold being filled as shown at 72 in Fig. 3, before the core is slid in, in order to secure a perfect fill under the core. The excess of fill 73 cut off remains in the hollow core until the molds are opened to the positions shown in Fig. 4 when it drops through the hollow of the core to the ground.

For molding the corner-blocks shown in Fig. 15, the main core as shown in Fig. 18 is used with the supplemental core 74, shown in Fig. 14, inserted from the top of the mold after filling the lower part and placing the regular core. The outer lines of this block and the confines of the mold are here indicated by the broken lines 75. The overlapping rounded extension 76 on the supplemental core forms the curved inner angle 77 of the crooked outer slab. After the mold is completely filled the supplemental core is drawn out in the direction indicated by the arrow-heads 78. In molding the metal anchored blocks the anchors 68 are placed before the top filling, by inserting an end eye 79 through the space between the sections of the placed core, forcing it into the face slab beneath and then giving it a one-fourth turn to dispose the plane of the end eyes as shown in Fig. 17.

To prevent the core from dropping out by the force of its own weight when the mold is opened to the position shown in Fig. 4, the sliding gravity bolts 80 are disposed through the perforated lugs 81 on the core-loops,—see Fig. 34,—and through the corresponding perforations 82 through the flange of the cross angle-bar 48 as shown in Fig. 2. These bolts slide downwardly when the core is completely inserted, and their points engage in the perforations 83 in the legs of the core-frame to lock the core inserted. After the mold is opened the bolts are withdrawn and the core eased down by hand to avoid the shock incident to letting it fall.

The partition 69 is to cross-divide the mold when shorter ornamental-face blocks are molded. It is applied to the mold at the positions shown in Figs. 18, 20 and 22, where plans of the confines of the mold are indicated by the broken lines 84. Special face-plates or mold-bottoms 85,—see Fig. 25,—are used at one or both sides of the partition, depending on whether one or two of the ornamental-faced short blocks are being molded in the same mold. The partition is fastened in the mold as shown in Fig. 24. Its inner lower corner 86 is notched to engage the horizontal flange of the angle-bar 30 at the bottom of the central partition or mold-back 28. Its outer corner has a downwardly curved branch 87 to form a seat to engage the journal-bar 32. A set-screw 88 disposed through the branch fastens the partition to the journal-bar at any required lateral adjustment.

The mold front-plate or pallet board 47 is preferably made of sheet metal, as illustrated by Figs. 26 to 30 inclusive. A blank of rectangular shape and the size requisite has formed therethrough a central opening of the size and shape of a cross section of the largest core. A portion of the center of the plain sheet is first removed leaving enough at the sides of the opening to bend outwardly, from what is to be the face of the pallet, to form the side flanges 89 of width equal to the thickness of the pallet less the thickness of the sheet being worked. Remaining portions at the ends are bent outwardly to form the end flanges 90 of width equal to the whole thickness of the pallet board. Connecting strips 91 are bent to a rectangular U-shape around each end and riveted to the end flanges and the legs lapped against and riveted to the ends of the side flanges to unite the whole and form a continuous outstanding stiffening flange entirely around the central opening. The outer edges of the sheet are bent outwardly from the face of the pallet at right angles and narrower edge portions again bent at right angles toward the center to form a continuous stiffening channel edge 92 of requisite thickness for the whole board. The side and end channels are mitered together at the corners and the triangular splicing pieces 93 disposed within across the joint and riveted as shown. To modify the central opening to fit the core or cores used, fillers 94 are used; the arrangement here shown being for cores like those applied in Figs. 1 to 6 inclusive. The fillers comprise the face plate 94 having the side flanges of width equal to the side flanges of the opening through the pallet board, and the outwardly-bent flanges or lugs 95 to engage the edges of the side flanges of the opening to bring the faces of the filler and board flush. Central perforations 52 in the filler flanges and a series of like perforations 52 along the side flanges of the opening to receive the fastening bolts 96 facilitates fastening therein any desired width of filler at the required position. When molding large quantities of blocks of a material desired to be left to season on the pallet board, the modification in wood, shown in Fig. 31, having substantially the same working features, is advantageous in being much cheaper.

Figure 42:
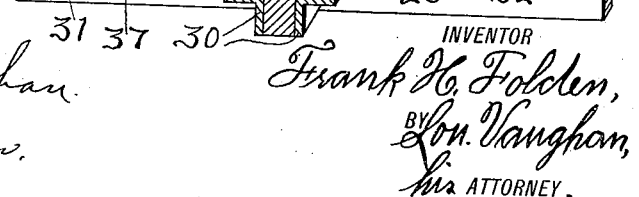

All the molds for blocks, including that for the facing or course slab, Fig. 13, which is molded in the shallow head, as arranged in Figs. 10, 11 and 40, have end filler-plates; for these may be substituted the slip-plates to mold ornamental panels on the ends of return or corner blocks. Both filler and slip plates for all these molds being of the same structure and operation. For illustration, a filler plate 97 is shown on one side and a traveling or slip-plate 98 on the opposite side of the deep mold back or partition 28 as shown in Fig. 42. The filler plate has the semicircular notch 99 at its lower outer corner to seat the plate on the journal-bar, the inner lower corner having the notch 100 to engage the extending flange of the angle-bar at the base of the partition. A machine screw 101 disposed through the upper edge of the side-plate, as shown in Fig. 1, engages a threaded semi-perforation in the filler plate and fastens it for molding plain-ended large blocks. The panel-end-molding or slip-plate has its lower edge disposed between the end of the bottom-plate and the side-plate,—see also Fig. 6,—which sustains it from falling away from the side-plate. It is supported and carried by the detachable lugs 102 fastened to the underside of the bottom-plate to project beyond the end thereof as shown in Fig. 32. It swings out edgewise with the bottom-plate and pallet board as indicated by the broken line 103, until the mold is opened entirely out and it has passed the end of the side-plate and will fall away from the end of the block; it is then easily replaced in the mold when closed for the next molding. The threaded semi-perforations 104 in the lower edges of these plates are below the molding face of the bottom plates when using the panel faces; by reversing this plate, turning the panel side out against the side-plate and its bottom edge to the top, the threaded semi-perforation will register with the perforation through the side-plate to receive the fastening screw 101 and the plate then serves as a filler plate; the carrying lugs being removed from the bottom-plate. As the proportion of return ends required to be molded is small a full set of such reversible filler or slip-plates is not generally required.

In the shallow mold-head when arranged for molding bricks, the filler plates are all omitted and the central partition or back-plate 15 is made thinner, as shown in Figs. 7, 8 and 38; this is done to get six bricks in thickness into the width of the machine and to mold said bricks a little longer than the wall height of the blocks and slabs. But filler-plates 105, and slip-plates 106, and a saddle 107 to increase the thickness of the central cross partition, are added in molding the slabs. Said saddle, shown detached in Fig. 41, comprises two rectangular plates 107 supported spaced apart flatwise by the spreader-rivets 108 disposed to drop into the notches 109 in the top of the cross partition. While the toothed parts of the quadrant gears 110 and the larger gears 111, and the journal-bars 112, 113 and the stud-journals 114, 115 at their ends on which the gears are mounted, are identical in form, size, position and function, with like parts of the deep mold-head, the arms 116 and 117 on said gears are made shorter to carry the connecting angle-bars 118 and 119 at the requisite height for this shallow mold. Arranged for brick molding, the longitudinal partitions 16 have a central notch 120 in the lower edge of each by which with the notches 109 in the top edge of the cross-partition 15 they are connected to bring their top edges flush, as shown, and to agree with the top edges of the side-plates 160. The curved notches 121 are disposed at the ends of the lower edges of these longitudinal partitions to seat on the journal-bars for additional support.

Each brick mold has a right-angled rocking-arm,—see Figs. 8, 9 and 35,—comprising a bottom arm 122 having a forked box 123 to turn on the journal-bar and a pallet-arm 105 to carry the pallet board. The swinging ends of the pallet arms are perforated for screw connection with the angle-bars carried by the arms of the gears; and have a base crook 124 to form a notch to engage the plain end of the mold-bottoms or face-plates 125, shown in detail in Fig. 33. The swinging end of the bottom-arm has a threaded perforation to receive a screw disposed through the countersunk perforation through the flange 126 at the opposite end of said face-plate. The same mold-bottoms used for other large blocks are applied in this mold-head in molding the facing slabs, using the same rocking arms as for the brick-mold bottoms. The pallet boards for this mold-head may be of sheet metal construction as shown at 127 Fig. 8, or solid as shown in section at 128. When ornamental or return ends are desired on the brick, the mold therefor is worked in the face of the pallet board as shown at 129, in Fig. 9, and the bricks transferred to other boards 130 for off-bearing.

The four right angled transfer rocking-arms are disposed a pair at each end of the machine and each pivoted on an arm 20 of the machine frame. Each consists of a receiving arm 132 having a longitudinal slot 133 and a hinging eye 134, and a delivering arm 135 having a transverse bolt-hole 136 toward its swinging end. These transfer rocking-arms are pivoted to the frame arms as shown by Figs. 36 and 37. The stud-journal 137 has in its base shoulder the concentrically curved recess 138. The lug 139 at the rim of the eye of the mounted rocking-arm is disposed in and impinges the ends of said recess to limit the movement to a one-fourth revolution. When the arms are rocked inwardly, as shown in Fig. 1, if the molds are opened the pallet board swings outwardly and downwardly onto the receiving arms with the molded block imposed thereon as shown in section at 140 in Fig. 4. In the same view at the opposite end of the machine a section of a solid block 141 is shown transferred onto the board 142; which is done by placing said board against the delivering arms of this end pair, then drawing the pallet board and the imposed block from the open mold out against the block 142 and then rocking the arms, boards and block outwardly to the position shown. The angle lugs 143 at the junctions of the faces of the arms each serve as a brace to the angle and a stop to bring the edges of the boards to proper relative positions. Its bearing faces 145 are tapered toward the bearing faces of the arms to produce the beveled flanks 144 to throw off the waste concrete that accumulates in the angles to obstruct the seating of the edges of the boards. For transferring the facing slabs and bricks adjusting brackets comprising the delivering bars 146 having at the outer ends the slotted arms 147 are bolted to the transfer rocking-arms as shown in Figs. 7, 8, 10 and 11. This contrivance renders the receiving arms adjustable in length as shown and facilitates the delivery of the molded work on the special boards 130 and 148 as indicated by the broken lines 149 and 150 in these views.

Casings to protect the gear-wheels of the deeper mold-head, consist of a single rectangular sheet of metal having a top or roof portion 151 disposed at an angle as shown in Figs. 5 and 6 and fastened by screws threaded in the supporting lugs 152 at the upper outer edge of the side-plates. See also Fig. 1. A curtain portion 153 extends down vertically from this and has perforations to receive the outer ends of the stud-journals on which the gears are mounted. This plate-curtain thus serves as washers to retain the gears, the cotter-pins 154 being placed outside of it. In the shallow mold-head the gears when the mold is open extend above the tops of the side-plates as shown in Fig. 11; hence, the roof 155 is hinged to the top edge of the curtain part 156 as shown most plainly in Fig. 9. This curtain has the triangular supporting bracket 157 disposed out of the sweep of the gears at the center of the top. The roof is swung up and out by the ascending gears, as indicated by dotted lines 158 in Fig. 9, and automatically falls back by its own weight to cover the gears when the molds are closed for filling. The curtain part serves as washers between the gear-wheels and cotter-pins 159 which secure it in the same manner as in the deeper mold-head.

As the principal faces of all the blocks are molded on the bottom of the molds, dust or granular facings are easily deposited on the bottom face-plates before the rougher body materials are cast into the molds.

I claim:

1. A mold, comprising the combination of a stationary back-plate and side-plates in fixed angular relation, a fixed journal-bar disposed across through said side-plates and its ends shaped to form stud-journals on the outsides thereof, a single swinging-arm mounted to turn on each stud-journal and connected by suitable operating mechanism to swing the arms simultaneously, a cross-bar rigidly connected to the ends of said swinging-arms, a rocking-member, consisting of a bottom-arm and a pallet-arm in fixed angular relation, mounted to turn on said journal-bar and the outer end of the pallet-arm fastened to said cross-bar, a bottom-plate disposed on said bottom-arm to swing flatwise between said side-plates, a pallet-board having a central opening and adapted to be removably seated on said pallet-arm to close against or swing away from the ends of said side-plates, a core placed to slide forth and back through the opening in the seated pallet-board and across the mold, a loop formed by an intermediate outward bend in said pallet-arm to receive and carry the outwardly slid core, a guide-leg disposed outwardly on the outer end of said core, a guide-lug on said loop to carry said guide-leg, and a sliding bolt disposed through one side of said loop to engage a perforation in said guide-leg to lock the core inserted through the mold.

2. In a mold, the combination of a fixed journal-bar, a pair of rocking members each consisting of a bottom-arm mounted to turn on said journal-bar and laterally shiftable therealong and a pallet-arm disposed at a fixed angle to said bottom-arm, a bottom-plate mounted on said bottom-arms fastened laterally shiftable along said bottom-plate, a cross-bar of greater length than the space between the pallet-arms and the pallet-arms connected laterally shiftable along said bar, a pallet-board having a central opening and adapted to be removably seated on said pallet-arms, fillers to reduce and divide said opening, a divisible and adjustable core disposed to slide through said opening and across the mold, loops formed by outwardly-disposed intermediate bends in said pallet-arms to receive and carry said core, and a U-shaped core-frame disposed to slide between said loops and having its legs fastened laterally adjustable in separable parts of said core.

3. In a mold, a pallet-board having an intermediate opening therethrough, and a core disposed to slide through said opening and into said mold, in combination with a swinging arm disposed across the outer face of said pallet-board to support and carry the same and having an integral loop formed by an intermediate outwardly bent portion disposed to receive and carry the outwardly slid core.

4. In a mold, a swinging removable pallet-board having a centrally disposed opening therethrough, and a core arranged to slide through said opening into and across the mold, in combination with a swinging arm disposed across the outer face of said pallet-board to releasably support and carry the same, an outwardly disposed loop formed of an intermediate integral portion of said arm to receive and carry the outwardly-slid core, an outwardly-disposed guide-leg fastened on the outer end of said core and having a cross-perforation, and a locking bolt disposed loosely through a cross-perforation in one leg of said loop to engage the perforation in said guide-leg.

5. A mold, comprising a back-plate, an angle-bar disposed to form a projecting flange on the face of said back-plate along near its lower edge, side-plates fastened to the ends of said back-plate, a journal-bar disposed across between said side-plates, a detachable laterally-shiftable partition-plate having one end notched to engage the flange on the back-plate and a downwardly-curved arm at the lower outer corner to form a notch to seat on the journal-bar, and a set-screw disposed through said arm to engage said journal-bar.

6. A mold comprising a back-plate and side-plates in fixed angular relation, a bent rocking support having a base arm journaled between said side-plates and having an outer pallet arm, and a bottom-plate fastened on said base arm to swing flatwise between said side-plates, in combination with a pallet board having a central opening and adapted to be removably seated on said pallet arm and close against the ends of said side-plates, a tubular open-ended core adapted to be inserted through the opening in said pallet board and across the mold and having end edges to cut away any excess of filling above the bottom of said inserted core, and an extension on said rocking support to guide and carry said core when withdrawn from the mold and swing it to a vertical position to empty its load of excess filling.

7. A mold comprising a back-plate and side-plates in fixed angular relation, a bottom-plate pivoted to swing flatwise between said side-plates and having one edge spaced away from the adjacent side-plate, a front-plate connected in rigid angular relation to said bottom-plate to swing to and from the ends of said side-plates, a slip-plate shaped to mold an ornamental panel and its lower edge disposable in the space between said bottom-plate and side-plate and removable lugs on the under side of said bottom-plate and extended beyond the edge thereof to support and carry said slip-plate.

8. A mold comprising a back-plate and side-plates in fixed angular relation, a rocking support journaled to swing in a plane parallel with said side-plates, a bottom-plate mounted on said support to swing flatwise between said side-plates and having one edge spaced away from the adjacent side-plate, a removable front-plate carried with said rocking support in rigid angular relation to said bottom-plate to swing against and from the ends of said side-plates, detachable lugs disposed on the bottom of said bottom-plate to project under the space between it and said adjacent side-plate, a reversible slip-plate having one face shaped to form an ornamental panel mold and a threaded semi-perforation in the lower edge of a wider margin at the bottom of said panel mold face and adapted to be carried by said lugs and to be reversed with its mold face toward the side-plate and fastened thereto by a screw inserted through the top of said side-plate into said threaded semi-perforation.

9. A mold comprising a back-plate and side-plates in fixed angular relation, a journal-bar disposed at right angles to said side-plates, a pair of bent rocking-arms mounted on said journal-bar, and a bottom-plate mounted on said rocking-arms to swing flatwise between said side-plates, in combination with a pallet board having a central opening and adapted to be removably seated and carried with said rocking-arms at an angle to said bottom-plate and swing against and from the ends of said side-plates, a sectional core consisting of laterally arranged tubes spaced apart by spreaders and bolted together and adapted to be inserted through the opening in said pallet board into said mold, outwardly disposed loops on said rocking-arms disposed to agree with the opening in said pallet board to carry and guide said core, a U-shaped core-frame disposed between said loops and its legs disposed and fastened in tubes of the core, and guide lugs on said loops to engage and guide said core-frame.

10. A sheet-metal pallet board for molds of the character described, comprising a sheet of metal having outer edges bent to form stiffening channels of width equal to the desired thickness of the board, a central core-opening and the edges of the sheet along the sides of said opening bent to form stiffening flanges of less width than the desired thickness of the board and having perforations therethrough, filler-plates having at opposite edges flanges of width equal to the flanges along the sides of said opening and to abut thereagainst, and extensions on said filler flanges bent outwardly to seat against the standing edges of the flanges they abut and bring the face of the filler plates flush with the face of the board and said filler flanges perforated to receive fastening bolts disposed through the perforations in the flanges they abut.

11. In a mold, the combination of a stationary vertical side-plate, stud-journals on the outside of said side-plate, gear-wheels mounted on said stud-journals, a vertical shield-plate having perforations to receive said stud-journals and disposed on said stud-journals between the hubs of said gear-wheels and the retaining cotter-pins, and a top plate hinged to the top edge of said vertical shield-plate to close against said side-plate.

In testimony whereof I have affixed my signature in presence of two witnesses.

FRANK H. FOLDEN.

Witnesses:
  PAUL T. LIPPINCOTT,
  CLAR C. LOTHROP.

---

Copies of this patent may be obtained for five cents each, by addressing the "Commissioner of Patents, Washington, D. C."